(12) United States Patent
Qiao et al.

(10) Patent No.: US 8,336,015 B2
(45) Date of Patent: Dec. 18, 2012

(54) PRE-ROUTE AND POST-ROUTE NET CORRELATION WITH DEFINED PATTERNS

(75) Inventors: Changge Qiao, Santa Clara, CA (US); Chi-Min Chu, Cupertino, CA (US); Jing C. Lin, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 193 days.

(21) Appl. No.: 12/697,142

(22) Filed: Jan. 29, 2010

(65) Prior Publication Data

US 2011/0061038 A1  Mar. 10, 2011

Related U.S. Application Data

(60) Provisional application No. 61/240,574, filed on Sep. 8, 2009.

(51) Int. Cl.
*G06F 17/50* (2006.01)

(52) U.S. Cl. ........................................ 716/132

(58) Field of Classification Search .................. 716/100, 716/132
See application file for complete search history.

(56) References Cited

U.S. PATENT DOCUMENTS

| | | | |
|---|---|---|---|
| 5,311,443 A | 5/1994 | Crain et al. | |
| 6,487,705 B1 | 11/2002 | Roethig et al. | |
| 6,973,632 B1 | 12/2005 | Brahme et al. | |
| 7,149,991 B2 | 12/2006 | Kovacs-Birkas et al. | |
| 7,178,118 B2 | 2/2007 | Ramachandran | |
| 7,448,012 B1 | 11/2008 | Qian | |
| 8,112,733 B2 | 2/2012 | Frankle et al. | |
| 2004/0243964 A1* | 12/2004 | McElvain et al. | 716/12 |
| 2006/0271907 A1 | 11/2006 | Izuha et al. | |
| 2008/0127000 A1 | 5/2008 | Majumder et al. | |
| 2009/0254874 A1 | 10/2009 | Bose | |
| 2009/0307642 A1 | 12/2009 | Lai et al. | |
| 2009/0319977 A1* | 12/2009 | Saxena et al. | 716/13 |
| 2011/0061037 A1* | 3/2011 | Croysdale et al. | 716/122 |
| 2011/0061038 A1 | 3/2011 | Qiao et al. | |

OTHER PUBLICATIONS

Kundu, Sandip et al. "A Small Test Generator for Large Designs", International Test Conference, 1992 IEEE, pp. 30-40.
Zhu, Qi et al. "SAT Sweeping with Local Observability Don't-Cares", DAC 2006, Jul. 24-28, 2006, San Francisco, CA, USA, pp. 229-234.

* cited by examiner

*Primary Examiner* — Suchin Parihar
(74) *Attorney, Agent, or Firm* — Bever, Hoffman & Harms, LLP; Jeanette S. Harms

(57) ABSTRACT

A method of improving pre-route and post-route correlation can include performing an initial placement, virtual routing, and lower-effort actual routing for the design. The results of the virtual routing and lower-effort actual routing can be compared to identify nets having miscorrelation. Based on the nets having at least a predetermined miscorrelation, one or more patterns can be defined. At this point, net routing constraints and/or scaling factors can be assigned to nets matching the defined patterns. These net routing constraints and scaling factors can be applied to the nets of the design that match the patterns. Optimized placement and a higher-effort actual routing of the design can be performed using the nets with the applied net routing constraints and scaling factors. An optimized, routed design can be generated as output.

56 Claims, 3 Drawing Sheets

FIG. 3

| Net_Name | Estimated | Annotated | Difference | Farout | Lenght | bbox_lx | bbox_ly | bbox_wrx | bbox_wry | bbox_lenght | wl_ratio | Congestion(H) | Congestion(V) | Pattern |
|---|---|---|---|---|---|---|---|---|---|---|---|---|---|---|
| l_ALU/r301/n44 | 0.00071 | 0.0014 | -49.40374 | 2 | 9.43 | 1.77 | 26.45 | 2.41 | 31.425 | 5.525 | 0.129 | 0.2471 | 0.1114 | pattern 2 |
| l_ALU/Decode_add_75/n26 | 0.00063 | 0.0012 | -47.92518 | 2 | 7.535 | 21.91 | 21.345 | 26.73 | 21.42 | 4.895 | 64.267 | 0.2701 | 0.0997 | pattern 1 |
| l_ALU/n193 | 0.00069 | 0.00131 | -47.02045 | 1 | 6.493 | 15.163 | 90.54 | 21.91 | 99.56 | 5.927 | 297.85 | 0.2545 | 0.1057 | pattern 1 |
| l_ALU/Decode_add_667/n167 | 0.00075 | 0.00137 | -45.58945 | 1 | 5.43 | 59.445 | 21.544 | 60.82 | 26.345 | 5.974 | 0.299 | 0.3172 | 0.0991 | pattern 2 |
| l_ALU/n311 | 0.00073 | 0.00135 | -45.50621 | 1 | 8.025 | 92.15 | 41.58 | 52.55 | 46.535 | 5.335 | 0.077 | 0.291 | 0.1747 | |
| l_STACK_TOP/l2_STACK_MEM/Stack_Mem_5 | 0.00156 | 0.00277 | -45.4 | | | | | | | | 3.785 | 0.3364 | 0.1101 | pattern 2 |
| l_ALU/Decode_sub_84/n83 | 0.00092 | 0.00161 | -45.4 | | | | | | | | 1048576 | 0.2615 | 0.1126 | |
| l_DATA_PATH/n13_4 | 0.00095 | 0.01921 | -44.4 | | | | | | | | 0.003 | 0.2234 | 0.0347 | pattern1 |
| Xecutng_Iratm[15] | 0.00109 | 0.00191 | -44.4 | | | | | | | | 14.031 | 0.3216 | 0.1168 | pattern 2 |
| PopOsteOut[9] | 0.00105 | 0.00183 | -43.4 | | | | | | | | 520 | 0.3412 | 0.1241 | pattern 1 |
| l_ALU/n261 | 0.00108 | 0.00186 | -43.4 | | | | | | | | 22.325 | 0.3118 | 0.1102 | pattern 1 |
| n27 | 0.00095 | 0.00182 | -43.4 | | | | | | | | 0.535 | 0.3499 | 0.1025 | pattern 1 |
| l_ALU/Decode_add_66/n43 | 0.00105 | 0.00265 | -42.4 | | | | | | | | 124.455 | 0.3211 | 0.1 | |
| l_REG_FILE/Reg_Array_2_14_ | 0.00155 | 0.00116 | -42.4 | | | | | | | | 4.436 | 0.3241 | 0.0705 | pattern 1 |
| l_STACK_TOP/l3_STACK_MEM/n5 | 0.00069 | 0.00116 | -41.4 | | | | | | | | 49.373 | 0.2982 | 0.0985 | |
| l_CONTROL/n16 | 0.00069 | 0.00152 | -41.4 | | | | | | | | 0.14 | 0.2836 | 0.0674 | pattern 1 |
| l_ALU/r301/n111 | 0.00097 | 0.00147 | -40.4 | | | | | | | | 0.542 | 0.2558 | 0.1061 | |
| Xecutng_Iratm[30] | 0.00035 | 0.00173 | -39.4 | | | | | | | | 6.814 | 0.2496 | 0.0461 | pattern 1 |
| l_STACK_TOP/l1_STACK_MEM/Stock_Mem_1_5 | 0.00106 | 0.0017 | -39.4 | | | | | | | | 75.043 | 0.3277 | 0.0945 | pattern 2 |
| l_CONTROL/n43 | 0.00104 | 0.00216 | -38.52222 | 1 | 10.615 | 91.588 | 56.89 | 56.73 | 39.06 | 8.912 | 3.107 | 0.2419 | 0.0982 | |
| l_ALU/Decode_add_66/n99 | 0.00135 | 0.00183 | -38.33515 | 3 | 11.455 | 43.365 | 21.42 | 48.49 | 26.147 | 10.452 | 0.962 | 0.3211 | 0.1 | |
| l_ALU/add_0_root_Decode_add_81/n65 | 0.00114 | 0.00103 | -37.43441 | 3 | 10.5 | 14.522 | 1.12 | 23.35 | 1.26 | 9.178 | 118.068 | 0.2835 | 0.0985 | pattern 1 |
| l_ALU/n276 | 0.00065 | 0.00158 | -37.24303 | 1 | 5.68 | 18.535 | 23.896 | 23.53 | 23.94 | 5.239 | 2.489 | 0.2301 | 0.0997 | pattern 1 |
| l_ALU/Decode_add_75/n53 | 0.001 | 0.00363 | -36.24716 | 2 | 9.065 | 2.73 | 51.545 | 5.62 | 56.7 | 3.995 | 0.563 | 0.2514 | 0.1123 | |
| l_REG_FILE/Reg_Array_1_14_ | 0.00235 | 0.00196 | -35.81994 | 2 | 22.335 | 142.55 | 69.285 | 162.39 | 69.4 | 19.955 | 172.522 | 0.3335 | 0.0724 | pattern 1 |
| l_ALU/n49 | 0.00075 | 0.00117 | -35.62623 | 1 | 10.58 | 22.865 | 99.19 | 50.08 | 102.089 | 10.114 | 2.489 | 0.2738 | 0.0995 | |
| l_STACK_TOP/l1_STACK_MEM_FSM/n18 | 0.00065 | 0.001 | -35.2979 | 2 | 6.24 | 114.09 | 1.194 | 116.544 | 3.75 | 5.34 | 1.065 | 0.3509 | 0.1029 | |
| l_CONTROL/n22 | 0.00106 | 0.00164 | -35.54112 | 2 | 9.528 | 3.2 | 91.595 | 99.19 | 95.68 | 99.781 | 4.576 | 0.3157 | 0.1341 | pattern 1 |
| l_ALU/Decode_add_66/n45 | 0.00067 | 0.00147 | -34.92977 | 2 | 9.528 | 44.31 | 34.02 | 47.054 | 39.126 | 7.38 | 6.343 | 0.3435 | 0.1256 | |
| Iratm[31] | 0.00302 | 0.00102 | 34.29803 | 2 | 8.184 | 53.509 | 124.305 | 55.545 | 129.765 | 7.895 | 0.41 | 0.2814 | 0.0637 | |
| l_ALU/n187 | 0.00258 | 0.00457 | -33.97275 | 1 | 4.705 | 35.95 | 99.455 | 41.803 | 99.54 | 4.942 | 57.141 | 0.3156 | 0.135 | pattern 1 |
| n26 | 0.00075 | 0.00383 | -33.97275 | 1 | 24.53 | 59.99 | 99.295 | 78.89 | 64.26 | 23.865 | 3.807 | 0.2819 | 0.1308 | |
| l_STACK_TOP/l2_STACK_MEM/n147 | 0.00238 | 0.00156 | -33.41203 | 4 | 24.24 | 112.81 | 13.26 | 123.111 | 23.94 | 20.381 | 1.022 | 0.3509 | 0.1029 | |
| l_ALU/n212 | 0.00075 | 0.00112 | -33.32658 | 1 | 7.817 | 52.69 | 108.62 | 58.105 | 109.747 | 5.58 | 42.937 | 0.3395 | 0.1377 | pattern 1 |

PRE-ROUTE AND POST-ROUTE NET CORRELATION WITH DEFINED PATTERNS

RELATED APPLICATIONS

The present application relates to U.S. Provisional Patent Application 61/240,574, incorporated by reference herein, entitled "Automatic RC Pattern Scaling Generation" and filed on Sep. 8, 2009 by Kevin Croysdale and Jason Upton.

BACKGROUND OF THE INVENTION

1. Field of the Invention

The present invention relates to integrated circuit design optimization and in particular to using defined patterns to improve pre-route and post-route correlation. This improved correlation results in better resource efficiency and quicker design closure.

2. Related Art

As technology nodes for integrated circuits get smaller, different parts of the design may pose significant challenges for IC designers. For example, wire delays can dominate cell delays in designs that use process technologies at 65 nm and below. Wire delay miscorrelation can be due to routing topologies, such as high fanout or congested areas of the design. Further, delay caused by via resistance can become an important issue for the 28 nm technology node and below. Currently, it is difficult to predict how many vias and what kind of vias will be used early in the design development. Yet further, lower metal layers can have 20-40 times per unit length resistance compared to higher metal layers at the 28 nm technology node and below. As a result, long nets in upper layers can have pessimistic delay estimations, and short nets in lower layers can have optimistic delay estimations.

A conventional place and route tool performs virtual (rough) routing based on an initial placement for net pins (stage referenced as "pre-route" herein). To address the above-described delay estimation issues, the conventional place and route tool uses average values for wire delays, via counts, and layer resistances. In contrast, during actual routing (stage also referenced as "post-route" herein), the conventional place and route tool uses detailed wire delays, via counts, and layer resistances, thereby generating quite accurate delay estimations. Unfortunately, to generate these delay estimations, significant system and time resources are needed. Therefore, to ensure the user is provided quick feedback on the design, virtual routing continues to use a less accurate delay model during the pre-route stage.

As a result of the above-described issues, the delay of a net assumed during circuit optimization at the pre-route stage may be very different from its actual delay after routing, thereby consequently misdirecting circuit optimization. This misdirecting may also leave critical nets un-optimized or non-critical nets over-optimized during pre-route optimization.

Therefore, a need arises for a method of improving pre-route and post-route delay correlation to provide an optimized circuit design. Because pre-route optimization is significantly more flexible than post-route optimization, post-route optimization should use limited optimization tricks to fix timing and design rule violations that cannot be easily predicted at the pre-route stage for design closure.

SUMMARY OF THE INVENTION

Different routing topologies, layer assignments, and via count estimations can significantly affect pre-route net delay estimations for state of the art integrated circuit designs. A method of improving pre-route and post-route correlation can include performing an initial placement, a virtual routing, and a lower-effort actual routing for the design. Note that the term "effort" refers to the aggressiveness of the optimization, e.g. the number of iterations used to eliminate design rule violations (which has a direct correlation to runtime). Further note that virtual routing only provides routing estimations and therefore does not perform the level of optimizations performed by actual routing.

The results of the virtual routing and the lower-effort actual routing can be compared to identify nets having miscorrelation. A significant miscorrelation can be determined by a user or identified by exceeding a set threshold. In one embodiment, the results can be ranked entries of a spreadsheet, thereby facilitating the comparison. Based on the nets having at least a predetermined miscorrelation, one or more patterns can be defined.

At this point, net routing constraints can be assigned to nets matching the defined patterns. The net routing constraints can include a routing layer constraint and/or a non-default routing rule. The routing layer constraint can relate to a minimum layer and/or a maximum layer used for net implementation. The non-default routing rule can relate to double width nets, double spacing between nets, a tapering rule, a number of via cuts, or another non-default via configuration. These net routing constraints can be applied to nets of the design with the defined patterns.

Placement optimization and a higher-effort actual routing of the design can be performed using nets with the applied net routing constraints. An optimized, routed design can be output. The method can further include comparing the results of the virtual routing and the higher-effort routing to refine pattern definition and net routing constraints.

In one embodiment, scaling factors can also be assigned to nets matching the defined patterns. Assigning scaling factors can include setting minimum horizontal capacitance, minimum horizontal resistance, maximum horizontal capacitance, maximum horizontal resistance, minimum vertical capacitance, minimum vertical resistance, maximum vertical capacitance, and maximum vertical resistance for a net. These scaling factors can be applied to the nets of the design with the defined patterns. In one embodiment, a via count scaling factor can be set, wherein at least one pattern is defined for via count scaling. The placement optimization can be performed using nets with the scaling factors.

The defined patterns can refer to the number of fanouts, bounding box size, bounding box aspect ratio, net length, congestion, slack, and/or coordinates (i.e. a specific set of coordinates that define an area of the chip). In one embodiment, a defined pattern can include at least one of a fanout theshold, a fanout boundary, a bounding box threshold, a bounding box boundary, a length threshold, a length boundary, a horizontal congestion threshold, a horizontal congestion boundary, a vertical congestion threshold, a vertical congestion boundary, a slack threshold, a slack boundary, coordinates (i.e. the two (x,y) coordinates that define a rectangular area of the chip), a bounding box aspect ratio threshold, and a bounding box aspect ratio boundary.

In one embodiment, the conventional default delay calculation model (e.g. the Elmore model) used in virtual routing can be replaced with a more precise delay calculation model (e.g. AWE) for use with the specific net patterns. A computer-readable medium storing computer-executable instructions for placing and routing a design of an integrated circuit can include instructions for performing the above-described steps.

The pattern-based RC scaling technique, which includes net routing constraints and/or scaling factors, can be used to improve pre-route and post-route net delay correlation. Other applications include optimizing away nets with predefined patterns by imposing pessimistic costs and/or trading-off buffering versus routing constraint assignments.

BRIEF DESCRIPTION OF THE FIGURES

FIG. 3 illustrates an exemplary spreadsheet that can be used to identify and rank miscorrelations.

DETAILED DESCRIPTION OF THE FIGURES

Electronic design automation (EDA) tools can be advantageously employed to optimize integrated circuit design during placement and routing stages. In general, the optimization performed during actual routing will try to eliminate design rule violations and therefore tends to require more iterations and a longer runtime compared to the estimated routing performed during placement.

In accordance with one aspect of the invention, a limited amount of additional information at the placement optimization stage can be used to significantly improve the correlation between the estimated routing performed during placement, called virtual routing (i.e. pre-route), and actual routing (i.e. post-route). This information can include pattern-based RC scaling. As described in further detail below, pattern-based RC scaling can be applied to patterns defined by routing topology, layer assignment, and other design aspects. In one embodiment, patterns can be defined for nets showing bad pre-route and post-route correlation. In another embodiment, the patterns can be further limited to those associated with critical nets, which are identified by the user and are typically a small percentage (e.g. less than 5%) of the total number of nets.

In addition to improving pre-route and post-route correlation, using pattern-based RC scaling can also allow the user to "optimize away" (i.e. discourage) certain patterns in the design. Moreover, pattern-based RC scaling can also allow the user to more effectively tradeoff between buffering and routing constraint assignment. These and other aspects of pattern-based RC scaling are described in further detail below.

Figure 1:
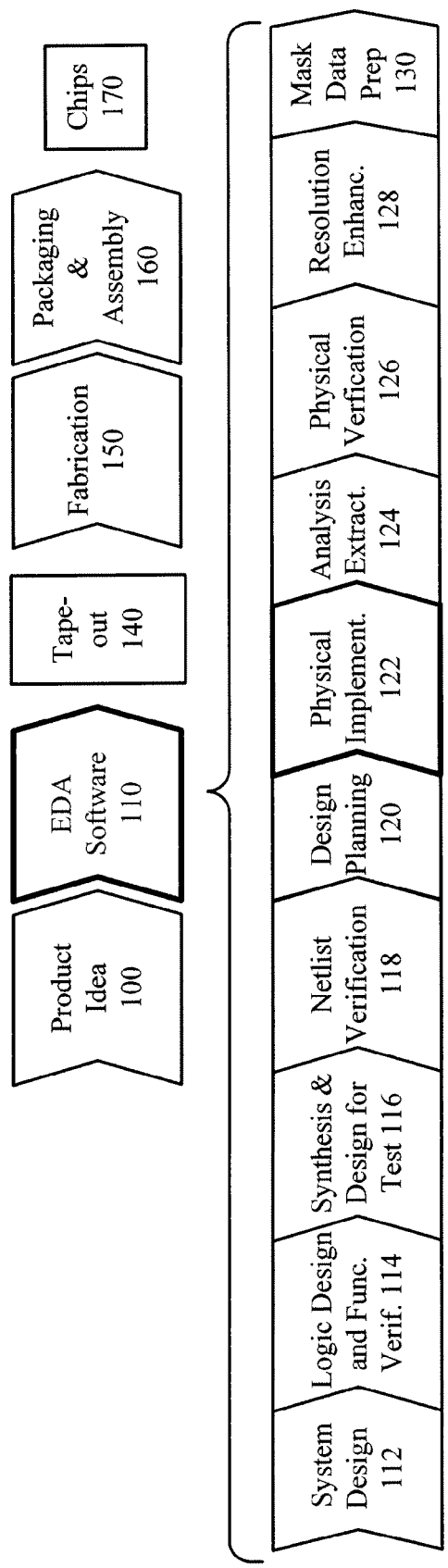
FIG. 1 illustrates a simplified representation of an exemplary digital IC design flow.

Before proceeding further with the description, it may be helpful to place this pattern-based RC scaling technique in context. FIG. 1 shows a simplified representation of an exemplary IC design flow. At a high level, the process starts with the product idea (step 100) and is realized in an EDA software design process (step 110). When the design is finalized, it can be taped-out (event 140). After tape out, the fabrication process (step 150) and packaging and assembly processes (step 160) occur resulting, ultimately, in finished chips (result 170).

The EDA software design process (step 110) is actually composed of a number of steps 112-130, shown in linear fashion for simplicity. In an actual IC design process, the particular design might have to go back through steps until certain tests are passed. Similarly, in any actual design process, these steps may occur in different orders and combinations. This description is therefore provided by way of context and general explanation rather than as a specific, or recommended, design flow for a particular IC.

A brief description of the components steps of the EDA software design process (step 110) will now be provided:

System design (step 112): The designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional effort. More specifically, does the design as checked to ensure that produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Exemplary EDA software products from Synopsys, Inc. that can be used at this step include Design Compiler®, Power Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products. In one embodiment, the pattern-based RC scaling technique can be performed by the IC Compiler tool. As described in further detail below, the pattern-based RC scaling technique can advantageously use lower-effort routing results from actual routing to define and/or refine pattern-based RC scaling at the placement stage. The IC Compiler tool can perform both virtual routing, which is done at the placement stage, and actual routing of an integrated circuit design.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): At this step various checking functions are performed to ensure correctness for: manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks for lithographic use to produce finished chips. Exemplary EDA software products from Synopsys, Inc. that can be used at this step include the CATS(R) family of products.

Pattern-Based RC Scaling

Virtual route (i.e. pre-route) net delay estimation performed at the placement stage can be enhanced by net routing constraints and/or RC scaling (also referred to as parasitic scaling in the electronic design automation (EDA) industry). In general, a scaling factor is a value that can be multiplied with the capacitance and/or resistance of a net matching a pattern to promote better design optimization.

The parasitics of nets that match a pattern can be manipulated in two ways. First, RC scaling factors can be set based on minimum and maximum as well as horizontal and vertical variables associated with capacitance and resistance. In one embodiment, an RC scaling factor for via count can also be set. In another embodiment, a more precise delay calculation model, e.g. AWE, can also be set. The pseudo-code shown below can provide the resistance/capacitance factors, the via count scaling factors, and the delay model.

```
set_pattern_delay_estimation_options
        -min_horizontal_capacitance_scaling factor    (float)
        -min_horizontal_resistance_scaling factor     (float)
        -max_horizontal_capacitance_scaling factor    (float)
        -max_horizontal_resistance_scaling factor     (float)
        -min_vertical_capacitance_scaling factor      (float)
        -min_vertical_resistance_scaling factor       (float)
        -max_vertical_capacitance_scaling factor      (float)
        -max_vertical_resistance_scaling factor       (float)
        -via_count_scaling factor                     (float)
        -default                                      (boolean)
        -pattern id                                   (integer)
        -delay_model                                  (string)
```

In one embodiment, setting the resistance/capacitance and via count scaling factors can be user-customized, i.e. the user sets the value for each scaling factor (wherein "float" indicates any non-zero, positive value, i.e. integer or fractional). As described in further detail below, for each set of scaling factors associated with a defined pattern, the user can also set the pattern identification (id). Note that the user can instead set the default option (boolean, i.e. true or false), which clears all RC scaling factors and via count scaling factors as well as resetting the delay model used in virtual routing to a less accurate model, e.g. Elmore.

Nets that match a pattern can also be subject to net routing constraints, which can include non-default routing rules and/or routing layer constraints. The non-default routing rules can refer to double width nets, double spacing between nets, tapering rules (with nets of varying widths), via cuts (wherein a default via normally has one cut and any additional cut can further reduce the via resistance), non-default vias, and other patterns of particular interest. The routing layer constraints can refer to minimum routing layer constraints and/or maximum routing layer constraints. In one embodiment, the net routing constraints can be user-generated.

The pseudo-code below can provide a non-default routing rule as well as a minimum routing layer constraint and a maximum routing layer constraint (wherein "string" indicates a plurality of letters and/or numbers, which can describe the non-default routing rule or routing layer constraint).

```
set_pattern_delay_estimation_options
        -rule rule_name              (string)
        -min_layer_name string       (string)
        -max_layer_name string       (string)
        -pattern id                  (integer)
```

Note that the rule_name identifies a specific non-default routing rule (generated by the user) that the tool then accesses to determine how the rule is defined. An exemplary pseudo-code for defining a rule is provided below.

```
define_routing_rule
        rule_name
        [-reference_rule_name ref_rule_name
                | -default_reference_rule]
        [-widths {layer_name_and_width_pairs}]
        [-spacings {layer_name_and_spacings_list_pairs}]
        [-spacing_weights {layer_name_and_weights_list_pairs}]
        [-shield]
        [-shield_widths {layer_name_and_shield_width_pairs}]
        [-shield_spacings {layer_name_and_shield_spacing_pairs}]
        [-snap_to_track]
        [-via_cuts {via_definition_list}]
        [-taper_level tapering_level]
        [-multiplier_width layer_width]
        [-multiplier_spacing layer_spacing]
        [-taper_distance tapering_distance]
```

In one embodiment, the routing constraint assignments do not explicitly assign specific resistances and capacitances; however, a routing constraint assignment to a non-default routing rule and/or a minimum or maximum layer of an integrated circuit implicitly has both resistance and capacitance that can be derived from these routing constraints.

In one embodiment, the net routing constraints can be given priority over the scaling factors. In this case, during pattern matching, when a net matches a pattern, then a net routing constraint will be applied and the scaling factors are ignored.

Patterns in a design can be defined using, for example, number of fanouts, congestion, a net bounding box (minimum or maximum size, or aspect ratio), slack (minimum or maximum value), and various combinations of the above factors.

For example, a fan-out count (e.g. a minimum fanout count (threshold) and/or a maximum fanout count (bound)) and the size of a net bounding box (bbox)(e.g. a minimum size (threshold) and a maximum size (bound)) can be used to define a specific pattern (1) using the following pseudo-code.

```
create_net_pattern
        -fanout_threshold      <fanout_count>
        -fanout_bound          <fanout_count>
        -bbox_threshold        <bbox_size>
        -bbox_bound            <bbox_size>
set_pattern_delay_estimation_options
        -min_horizontal_capacitance_scaling <factor>
        -min_horizontal_resistance_scaling <factor>
        -max_horizontal_capacitance_scaling <factor>
        -max_horizontal_resistance_scaling <factor>
        -min_vertical_capacitance_scaling <factor>
        -min_vertical_resistance_scaling <factor>
        -max_vertical_capacitance_scaling <factor>
        -max_vertical-resistance_scaling <factor>
        -pattern 1
```

Note that a bounding box can be defined by its lower left LL(x,y) coordinate position and its upper right UR(x,y) coordinate position (wherein the coordinates of the chip, e.g. length=maximum x and width=maximum y) are defined by the system). In general, a bounding box (bbox) surrounds a net, which is defined by all of its placed pins.

Advantageously, by using the number of fanouts and a bounding box, large fanout nets can be "optimized away".

Specifically, a user can effectively impose a penalty for large fanouts in the design by setting a high scaling factor to a pattern having a large number of fanouts and a predetermined size bounding box.

With respect to congestion, nets going through a congested area may have detours. Therefore, congestion values can be set to define a pattern, as shown by the pseudo-code below. Note that congestion can be expressed as a demand versus supply value. For example, a congestion threshold set to "0.80" can indicate that at least 80% of the possible tracks (the supply) in a predetermined area would be filled by nets (the demand), as estimated by pre-route. In one embodiment, the predetermined area can be established using a net's bounding box and the congestion can be the average congestion within that bounding box. Note that congestion both horizontally and vertically can be set, as shown below.

```
create_net_pattern
    -horizontal_congestion_threshold    <threshold>
    -horizontal_congestion_bound        <bound>
    -vertical_congestion_threshold      <threshold>
    -vertical_congestion_bound          <bound>
set_pattern_delay_estimation_options
    -min_horizontal_capacitance_scaling <factor>
    -min_horizontal_resistance_scaling <factor>
    -max_horizontal_capacitance_scaling <factor>
    -max_horizontal_resistance_scaling <factor>
    -min_vertical_capacitance_scaling <factor>
    -min_vertical_resistance_scaling <factor>
    -max_vertical_capacitance_scaling <factor>
    -max_vertical_resistance_scaling <factor>
    -pattern 2
```

Typically, a bounding box will include many global cells (which are small grids created by the router during global route, wherein global route is limited to inter-global cells (note that detailed route provides intra-global cell routing)). In this case, the congestion of a net can be measured by an average global cell congestion value (which takes into account all global cells of the bounding box including the net). Note that the same global cell grid can be used by both the virtual and actual routers.

With respect to net length, long nets are typically assigned to higher levels of metal layers, which have smaller RC values. Therefore, the net length can be used to define a pattern, which in turn can be associated with routing constraints. For example, the following pseudo-code can be used to define a pattern in which all nets over 50 microns long are assigned to metal layer M5 or higher.

```
create_net_pattern
    -length_threshold 50
set_pattern_delay_estimation_options
    -min_layer_name M5
    -pattern 3
```

Via resistance estimation can be improved using customized via count scaling with patterns. An exemplary pattern scaling via counts in a predetermined area of the design can be defined using the pseudo-code shown below. This pseudo-code could identify a congested area using the coordinates (lower left x,y (10, 10) and upper right x,y (20, 20)) and use a scaling factor of "2" to double the number of vias for that congested area.

```
create_net_pattern
    -coordinates "10 10 20 20"
set_pattern_delay_estimation_options
    -via_count_scale 2
    -pattern 4
```

With respect to net length, long nets with more fanout nets need more precise delay estimation. Therefore, the net length and fanout can be used to define a pattern, which in turn can be associated with a more precise delay model. For example, the following pseudo-code can be used to define a pattern in which all nets over 300 microns long and 5 or more fanout are assigned to use the AWE delay model.

```
create_net_pattern
    -length_threshold 300
    -fanout_threshold 5
set_pattern_delay_estimation_options
    -delay_model AWE
    -pattern 5
```

Note that other patterns for slack and bounding boxes (using aspect, e.g. width/length, ratios) can also be defined, as shown by the pseudo-code below:

```
create_net_pattern
    -slack_threshold        <float> slack threshold
    -slack_bound            <float> slack bound
    -bbox_wl_ratio_threshold <float> bbox W/L ratio threshold
    -bbox_wl_ratio_bound    <float> bbox W/L ratio bound
```

Note that slack_threshold and slack_bound can be negative numbers (i.e. integers or fractions). Slack threshold and bound can be used to force optimization to work harder on the net that matches the pattern.

In one embodiment, for the bbox_wl_ratio threshold/bound definitions, the width to height ratio can be checked to ensure it is within a certain range. For example, if bbox_wl_ratio_threshold is set to be 2.0, then the width of the bbox is at least 2× of the bbox length. On the other hand, if bbox_wl_ratio_bound is set to be 0.5, then the length of the bbox is at least 2× of the bbox width.

Figure 2:
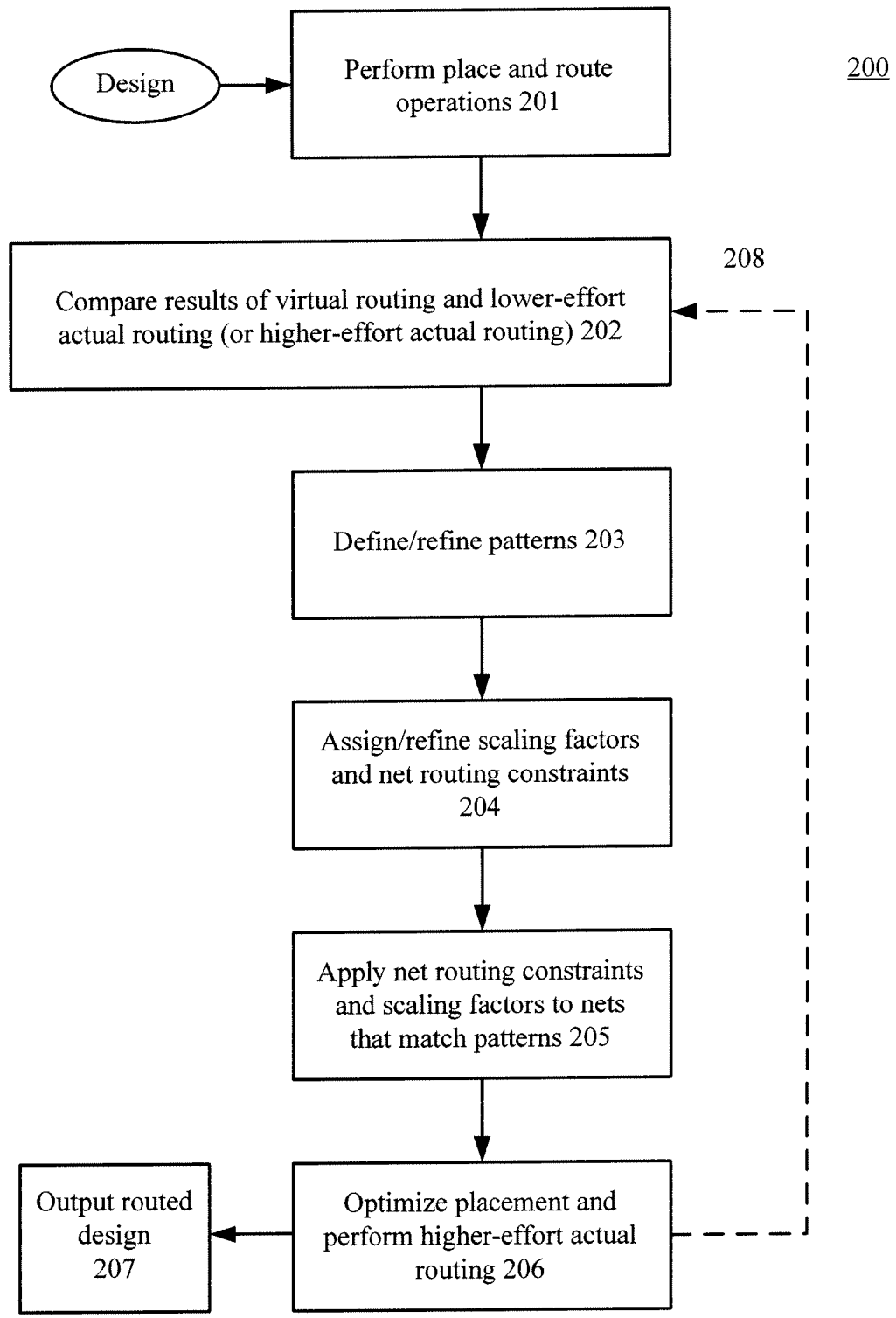
FIG. 2 illustrates an exemplary technique including pattern-based RC scaling.

FIG. 2 illustrates an exemplary technique 200 for generating the pattern-based net routing constraints and/or RC scaling factors, and then applying those net routing constraints and/or RC scaling factors to nets of an integrated circuit design. Step 101 can run a rough place and route of an accessed design. Note that a place and route tool can generally perform both virtual routing and actual routing. Moreover, actual routing can be performed with varying degrees of effort (e.g. low, medium, or high) using tool commands. In one preferred embodiment, the routing performed in step 201 includes virtual routing and low-effort actual routing, thereby minimizing runtime.

Step 202 can compare the results of the virtual routing and the low-effort actual routing of the design. This comparison can be done by analyzing real (albeit low effort) and estimated parasitics, resistances, and via counts. In one embodiment using an exemplary place and route tool, e.g. IC Compiler, step 202 can use the compare_rc, compare_rc-resistance, and compare_re-only_via_count commands. In one embodiment, step 202 can also include performing the compare_rc subroutine for specific patterns (e.g. using a compare_rc-pattern <pattern_id> command).

In one embodiment, the comparison data can be displayed in a spreadsheet 300, shown in FIG. 3, that allows sorting and ranking, thereby facilitating the identification of the nets with miscorrelation (e.g. by ranking discrepancies between the results of virtual routing and low effort actual routing). The nets with at least a predetermined miscorrelation (also called bad correlation) can be identified in step 202. Note FIG. 3 also illustrates a scatter plot 301 labeled "Annotated". Scatter plot 301 indicates the correlation between the estimated values (first column of spreadsheet 300) and the annotated or actual values (second column of spreadsheet 300). A perfect correlation would be represented by a 45 degree line. Thus, scatter plot 301 can advantageously provide the user with quick, visual feedback on the correlation between pre-route and post-route. Note that in FIG. 3, spreadsheet 300 provides capacitance values and another spreadsheet could provide resistance values for the same nets.

Step 203 can determine whether one or more common factors (e.g. net length, number of fanouts, etc.) of the nets with bad correlation exist, thereby effectively identifying a pattern. The identified patterns can then be defined for tool implementation (e.g. using the create_net_pattern command). Note that the defined patterns can be generated manually by the user or automatically by a place and route tool, such as IC Compiler. In one embodiment, automatic pattern generation can be done by comparing the parasitics (compare_rc) and identifying only the nets with a correlation below (or having a miscorrelation above) a predetermined threshold. In one embodiment, user input can be used to optimize automatic pattern generation.

In step 204, the net routing constraints and/or RC scaling factors for the defined patterns can be assigned (e.g. using the setpattern_delay_estimation_options command). After the net routing constraints and/or RC scaling factors for the defined patterns are assigned, step 205 can apply those net routing constraints and/or RC scaling factors to nets of the design that match the defined patterns.

In one embodiment, each net is checked against all of the criteria of the defined patterns. For example, to meet fanout criteria, the fanout number must be greater than or equal to the set threshold (when set) and must be smaller than the bound (when set). In other words, if one parameter is not specified, then that parameter is not checked. Using the fanout example above, if the fanout_threshold is set, but not the fanout_bound, then all nets with fanouts greater than or equal to the fanout threshold are considered matches.

In one embodiment of step 204, the patterns can be checked for matching in a predetermined order for each net. For example, the predetermined order can follow the pattern identification (ID) in numerical order. In general, once a match with one pattern is found, pattern checking for that net ends. In one embodiment, the user can specify the predetermined order for pattern checking. For example, if patterns 1-5 are defined and the user specifies a pattern check order of "3 5 2", then the pattern check order will be "3 5 2 1 4".

Step 206 can optimize placement and perform higher-effort routing (i.e. higher effort than the lower-effort actual routing) using the net routing constraints and RC scaling factors. Note that the RC scaling factors are not used during actual routing, but can advantageously be used during placement optimization. Step 207 can output a routed integrated circuit design.

In contrast, in step 206, the higher-effort routing can advantageously include net routing constraints associated with nets matching the defined patterns. For example, routing guidance can advantageously include non-default routing rules and routing layer constraints. Thus, if a user generates a pattern for a specific net length and assigns a specific layer for that defined pattern, then that routing layer constraint should be maintained throughout placement and actual routing in step 206. This type of constraint inheritance is desirable because of the operation of the place and route tool. That is, based on a certain net length, the place and route tool may insert one or more buffers to ensure good signal transmission. However, this buffer insertion can result in two or more nets of significantly shorter length compared to the original net. At this point, using the shorter nets, the net routing constraint may not be applied to the newly-created nets. Therefore, any net routing constraints should be maintained for routing optimization, such as buffer insertion, buffer removal, and high fanout net synthesis, in step 206.

As a result, these non-default routing rules and routing layer constraints can be characterized as being "sticky" because they are maintained and passed to the router in step 206. Note that such "inherited" net constraints can tradeoff with buffering to optimize cell count, density, and/or congestion.

In one embodiment, the routing results from step 206 can be fed back to step 202 via loop 208. For example, if the higher-effort routing performed in step 206 (first instance) is at a "medium" effort level, then loop 208 can be used for yet further refinement of the pre-route and post-route correlation by comparing the higher-effort actual routing with virtual routing in step 202. Note that the refinement of the net routing constraints and/or RC scaling factors can change the current placement, thereby also changing the actual routing performed in step 206. In one embodiment, steps 202-206 can be repeated until a predetermined correlation is achieved or the user requests the routed design in step 207. In one embodiment, the higher-effort actual routing performed in step 202 remains at the same level. For example, if the higher-effort actual routing is at the medium effort level in step 202 (first instance), then any subsequent instances of step 202 are also performed using the medium effort actual routing.

Note that in some embodiments, the scaling factors, non-default routing rules, and routing layer constraints of one design can be used for multiple designs (i.e. performing steps 201-204 for one design and steps 205-207 for one or more other designs). This multi-use may be possible for designs having a common technology node, similar cell utilization, and/or floor plans.

Note that step 202 uses a delay model for virtual routing. The Elmore delay model is used by conventional pre-route estimation because of the quick run time. However, the Elmore delay model may be too pessimistic for certain cases. Therefore, in one embodiment, a more precise delay model can be used in step 202.

Exemplary precise delay models include, but are not limited to, Arnoldi and AWE (asymptotic waveform estimator). Arnoldi is more accurate than AWE, but is also slow. Therefore, AWE is generally preferred over Arnoldi when a relatively accurate solution is needed and runtime is a concern.

In one embodiment, the AWE model can be used for only certain nets matching the predefined patterns. For example, the AWE model can be applied only to critical nets or those nets that have a delay larger than a predetermined threshold. In one embodiment, the predetermined threshold can be set to 0.001 ns. In one embodiment, the user can set the predetermined threshold.

As discussed above, the pattern-based RC scaling technique can be used to improve pre-route and post-route net delay correlation. Other applications include optimizing away nets with predefined patterns by imposing pessimistic costs and/or trading-off buffering versus routing constraint assignments by associating patterns with net routing constraints.

The pattern-based RC scaling technique can be implemented advantageously in one or more computer programs that execute on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of nonvolatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ICs).

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. For example, note that pattern-based RC scaling technique can be updated throughout place and route operations. Further note that although step 202 refers to a lower-effort actual routing and step 206 refers to a higher-effort actual routing, this distinction can also be characterized as a first-type actual routing and a second-type actual routing, wherein the iterations used by the second-type actual routing are greater than the iterations used by the first-type actual routing. Accordingly, it is intended that the scope of the invention be defined by the following Claims and their equivalents.

The invention claimed is:

1. A method of improving pre-route and post-route correlation for a design of an integrated circuit, the method comprising:
performing an initial placement, a virtual routing, and a lower-effort actual routing for the design, the lower-effort actual routing providing more aggressive optimizations than the virtual routing;
comparing results of the virtual routing and the lower-effort actual routing to identify nets having miscorrelation;
defining patterns based on the nets having at least a predetermined miscorrelation;
assigning net routing constraints to nets matching defined patterns;
applying the net routing constraints to nets of the design with the defined patterns;
using a computer, optimizing placement and performing a higher-effort actual routing of the design including nets with applied net routing constraints; and
outputting a routed design.

2. The method of claim 1, further including:
assigning scaling factors to nets matching defined patterns;
applying scaling factors to nets of the design; and
optimizing placement of the design using nets with scaling factors.

3. The method of claim 1, wherein the net routing constraints include at least one of a non-default routing rule and a routing layer constraint.

4. The method of claim 3, wherein the routing layer constraint relates to a minimum layer used for net implementation.

5. The method of claim 3, wherein the routing layer constraint relates to a maximum layer used for net implementation.

6. The method of claim 3, wherein the non-default routing rule relates to at least one of a double width, a double spacing, a tapering rule, a number of via cuts, and a non-default via.

7. The method of claim 2, further including comparing results of the virtual routing and the higher-effort actual routing to refine pattern definition and scaling factor assignment.

8. The method of claim 2, wherein defining patterns includes using at least one of a number of fanouts, a bounding box, a length, a congestion, a slack, and coordinates.

9. The method of claim 2, wherein defining patterns includes at least one of a fanout threshold, a fanout boundary, a bounding box threshold, a bounding box boundary, a length threshold, a length boundary, a horizontal congestion threshold, a horizontal congestion boundary, a vertical congestion threshold, a vertical congestion boundary, a slack threshold, a slack boundary, coordinates, a bounding box aspect ratio threshold, and a bounding box aspect ratio boundary.

10. The method of claim 2, wherein assigning scaling factors includes setting at least one of minimum horizontal capacitance, minimum horizontal resistance, maximum horizontal capacitance, maximum horizontal resistance, minimum vertical capacitance, minimum vertical resistance, maximum vertical capacitance, and maximum vertical resistance.

11. The method of claim 2, further including setting a via count scaling factor, wherein at least one pattern is defined for via count scaling.

12. The method of claim 2, further including setting a delay model for virtual routing.

13. The method of claim 12, wherein the delay model is AWE (asymptotic waveform estimator).

14. The method of claim 1, wherein comparing results includes ranking entries of a spreadsheet.

15. A non-transitory, computer-readable medium storing computer-executable instructions for placing and routing a design of an integrated circuit, the instructions when executed by a processor causing the processor to execute a process comprising:
performing an initial placement, a virtual routing, and a lower-effort actual routing for the design, the lower-effort actual routing providing more aggressive optimizations than the virtual routing;
comparing results of the virtual routing and the lower-effort actual routing to identify nets having miscorrelation;
defining patterns based on the nets having at least a predetermined miscorrelation;
assigning net routing constraints to nets matching defined patterns;

applying the net routing constraints to nets of the design with the defined patterns;
optimizing placement and performing a higher-effort actual routing of the design using nets with applied net routing constraints; and
outputting a routed design.

16. The computer-readable medium of claim 15, further including:
assigning scaling factors to nets matching defined patterns;
applying scaling factors to nets of the design; and
optimizing placement of the design using nets with the scaling factors.

17. The computer-readable medium of claim 15, wherein the net routing constraints include at least one of a non-default routing rule and a routing layer constraint.

18. The computer-readable medium of claim 17, wherein the routing layer constraint relates to a minimum layer used for net implementation.

19. The computer-readable medium of claim 17, wherein the routing layer constraint relates to a maximum layer used for net implementation.

20. The computer-readable medium of claim 17, wherein the non-default routing rule relates to at least one of a double width, a double spacing, a tapering rule, a number of via cuts, and a non-default via.

21. The computer-readable medium of claim 16, further including comparing results of the virtual routing and the higher-effort actual routing to refine pattern definition and scaling factor assignment.

22. The computer-readable medium of claim 16, wherein defining patterns includes using at least one of a number of fanouts, a bounding box, a length, a congestion, a slack, and coordinates.

23. The computer-readable medium of claim 16, wherein defining patterns includes at least one of a fanout threshold, a fanout boundary, a bounding box threshold, a bounding box boundary, a length threshold, a length boundary, a horizontal congestion threshold, a horizontal congestion boundary, a vertical congestion threshold, a vertical congestion boundary, a slack threshold, a slack boundary, coordinates, a bounding box aspect ratio threshold, and a bounding box aspect ratio boundary.

24. The computer-readable medium of claim 16, wherein assigning scaling factors includes setting at least one of minimum horizontal capacitance, minimum horizontal resistance, maximum horizontal capacitance, maximum horizontal resistance, minimum vertical capacitance, minimum vertical resistance, maximum vertical capacitance, and maximum vertical resistance.

25. The method of claim 16, further including setting a via count scaling factor, wherein at least one pattern is defined for via count scaling.

26. The method of claim 16, further including setting a delay model for the virtual routing.

27. The method of claim 26, wherein the delay model is AWE (asymptotic waveform estimator).

28. The computer-readable medium of claim 15, wherein comparing results includes ranking entries of a spreadsheet.

29. A method of improving pre-route and post-route correlation for a design of an integrated circuit, the method comprising:
performing an initial placement, a virtual routing, and a first-type actual routing for the design, the first-type actual routing providing more aggressive optimizations than the virtual routing;
comparing results of the virtual routing and the first-type actual routing to identify nets having miscorrelation;
defining patterns based on the nets having at least a predetermined miscorrelation;
assigning net routing constraints to nets matching defined patterns;
applying the net routing constraints to nets of the design with the defined patterns;
using a computer, optimizing placement and performing a second-type actual routing of the design including nets with applied net routing constraints, the second-type actual routing performing more iterations than the first-type actual routing; and
outputting a routed design.

30. The method of claim 29, further including:
assigning scaling factors to nets matching defined patterns;
applying scaling factors to nets of the design; and
optimizing placement of the design using nets with scaling factors.

31. The method of claim 29, wherein the net routing constraints include at least one of a non-default routing rule and a routing layer constraint.

32. The method of claim 31, wherein the routing layer constraint relates to a minimum layer used for net implementation.

33. The method of claim 31, wherein the routing layer constraint relates to a maximum layer used for net implementation.

34. The method of claim 31, wherein the non-default routing rule relates to at least one of a double width, a double spacing, a tapering rule, a number of via cuts, and a non-default via.

35. The method of claim 30, further including comparing results of the virtual routing and the second-type actual routing to refine pattern definition and scaling factor assignment.

36. The method of claim 30, wherein defining patterns includes using at least one of a number of fanouts, a bounding box, a length, a congestion, a slack, and coordinates.

37. The method of claim 30, wherein defining patterns includes at least one of a fanout threshold, a fanout boundary, a bounding box threshold, a bounding box boundary, a length threshold, a length boundary, a horizontal congestion threshold, a horizontal congestion boundary, a vertical congestion threshold, a vertical congestion boundary, a slack threshold, a slack boundary, coordinates, a bounding box aspect ratio threshold, and a bounding box aspect ratio boundary.

38. The method of claim 30, wherein assigning scaling factors includes setting at least one of minimum horizontal capacitance, minimum horizontal resistance, maximum horizontal capacitance, maximum horizontal resistance, minimum vertical capacitance, minimum vertical resistance, maximum vertical capacitance, and maximum vertical resistance.

39. The method of claim 30, further including setting a via count scaling factor, wherein at least one pattern is defined for via count scaling.

40. The method of claim 30, further including setting a delay model for the virtual routing.

41. The method of claim 40, wherein the delay model is AWE (asymptotic waveform estimator).

42. The method of claim 29, wherein comparing results includes ranking entries of a spreadsheet.

43. A non-transitory, computer-readable medium storing computer-executable instructions for placing and routing a design of an integrated circuit, the instructions when executed by a processor causing the processor to execute a process comprising:

performing an initial placement, a virtual routing, and a first-type actual routing for the design, the first-type actual routing providing more aggressive optimizations than the virtual routing;

comparing results of the virtual routing and the first-type actual routing to identify nets having miscorrelation;

defining patterns based on the nets having at least a predetermined miscorrelation;

assigning net routing constraints to nets matching defined patterns;

applying the net routing constraints to nets of the design with the defined patterns;

optimizing placement and performing a second-type actual routing of the design using nets with applied net routing constraints, the second-type actual routing performing more iterations than the first-type actual routing; and outputting a routed design.

44. The computer-readable medium of claim 43, further including:

assigning scaling factors to nets matching defined patterns;

applying scaling factors to nets of the design; and optimizing placement of the design using nets with the scaling factors.

45. The computer-readable medium of claim 43, wherein the net routing constraints include at least one of a non-default routing rule and a routing layer constraint.

46. The computer-readable medium of claim 45, wherein the routing layer constraint relates to a minimum layer used for net implementation.

47. The computer-readable medium of claim 45, wherein the routing layer constraint relates to a maximum layer used for net implementation.

48. The computer-readable medium of claim 45, wherein the non-default routing rule relates to at least one of a double width, a double spacing, a tapering rule, a number of via cuts, and a non-default via.

49. The computer-readable medium of claim 44, further including comparing results of the virtual routing and the second-type actual routing to refine pattern definition and scaling factor assignment.

50. The computer-readable medium of claim 44, wherein defining patterns includes using at least one of a number of fanouts, a bounding box, a length, a congestion, a slack, and coordinates.

51. The computer-readable medium of claim 44, wherein defining patterns includes at least one of a fanout threshold, a fanout boundary, a bounding box threshold, a bounding box boundary, a length threshold, a length boundary, a horizontal congestion threshold, a horizontal congestion boundary, a vertical congestion threshold, a vertical congestion boundary, a slack threshold, a slack boundary, coordinates, a bounding box aspect ratio threshold, and a bounding box aspect ratio boundary.

52. The computer-readable medium of claim 44, wherein assigning scaling factors includes setting at least one of minimum horizontal capacitance, minimum horizontal resistance, maximum horizontal capacitance, maximum horizontal resistance, minimum vertical capacitance, minimum vertical resistance, maximum vertical capacitance, and maximum vertical resistance.

53. The computer-readable medium of claim 44, further including setting a via count scaling factor, wherein at least one pattern is defined for via count scaling.

54. The computer-readable medium of claim 44, further including setting a delay model for the virtual routing.

55. The computer-readable medium of claim 54, wherein the delay model is AWE (asymptotic waveform estimator).

56. The computer-readable medium of claim 43, wherein comparing results includes ranking entries of a spreadsheet.

* * * * *

UNITED STATES PATENT AND TRADEMARK OFFICE
CERTIFICATE OF CORRECTION

PATENT NO. : 8,336,015 B2  Page 1 of 1
APPLICATION NO. : 12/697142
DATED : December 18, 2012
INVENTOR(S) : Changge Qiao et al.

It is certified that error appears in the above-identified patent and that said Letters Patent is hereby corrected as shown below:

In the Claims

Column 12
Line 25, insert --said-- before "defining".
Line 28, insert --said-- before "defining".
Line 36, insert --said-- before "assigning".
Line 47, insert --the-- before "virtual".
Line 50, insert --said-- before "comparing".

Column 13
Line 31, insert --said-- before "defining".
Line 35, insert --said-- before "defining".
Line 44, insert --said-- before "assigning".
Line 58, insert --said-- before "comparing".

Column 14
Line 36, insert --said-- before "defining".
Line 39, insert --said-- before "defining".
Line 47, insert --said-- before "assigning".
Line 61, insert --said-- before "comparing".

Column 16
Line 6, insert --said-- before "defining".
Line 10, insert --said-- before "defining".
Line 19, insert --said-- before "assigning".
Line 33, insert --said-- before "comparing".

Signed and Sealed this
Ninth Day of September, 2014

Michelle K. Lee
*Deputy Director of the United States Patent and Trademark Office*